United States Patent
Kobayashi

(10) Patent No.: US 7,963,873 B2
(45) Date of Patent: Jun. 21, 2011

(54) TRANSMISSION BELT

(75) Inventor: Daisuke Kobayashi, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 612 days.

(21) Appl. No.: 12/128,427

(22) Filed: May 28, 2008

(65) Prior Publication Data
US 2008/0305906 A1 Dec. 11, 2008

(30) Foreign Application Priority Data

Jun. 6, 2007 (JP) ................................ 2007-150833

(51) Int. Cl.
*F16G 5/16* (2006.01)
(52) U.S. Cl. ......... 474/242; 474/244; 474/201; 474/272
(58) Field of Classification Search .................. 474/240, 474/241, 242, 244, 237, 201, 272
See application file for complete search history.

(56) References Cited

U.S. PATENT DOCUMENTS

| | | | |
|---|---|---|---|
| 4,303,403 A | 12/1981 | Lamers | |
| 4,619,634 A * | 10/1986 | Nakawaki | 474/201 |
| 5,152,722 A | 10/1992 | Yamada | |
| 6,238,313 B1 * | 5/2001 | Smeets et al. | 474/244 |
| 6,332,854 B1 * | 12/2001 | Kanokogi et al. | 474/242 |
| 6,334,830 B1 * | 1/2002 | Yagasaki et al. | 474/242 |
| 6,440,024 B1 * | 8/2002 | Kobayashi | 474/242 |
| 6,755,760 B2 * | 6/2004 | Akagi et al. | 474/242 |
| 6,875,143 B2 * | 4/2005 | Brandsma | 474/242 |
| 6,893,370 B2 * | 5/2005 | Kobayashi | 474/242 |
| 7,108,624 B2 * | 9/2006 | Smeets et al. | 474/201 |
| 7,351,172 B2 * | 4/2008 | Brandsam et al. | 474/242 |
| 2002/0137585 A1 * | 9/2002 | Smeets et al. | 474/242 |
| 2002/0151399 A1 * | 10/2002 | Mott | 474/242 |
| 2002/0183152 A1 * | 12/2002 | Kobayashi | 474/242 |
| 2003/0195073 A1 * | 10/2003 | Okada et al. | 474/201 |
| 2004/0082417 A1 * | 4/2004 | Smeets et al. | 474/242 |

FOREIGN PATENT DOCUMENTS

| | | |
|---|---|---|
| JP | 55-100443 | 7/1980 |
| JP | 4-83940 | 3/1992 |

* cited by examiner

*Primary Examiner* — Emmanuel M Marcelo
(74) *Attorney, Agent, or Firm* — Oblon, Spivak, McClelland, Maier & Neustadt, L.L.P.

(57) ABSTRACT

A transmission belt is formed by annularly arranging elements including a plate-shaped first element and a plate-shaped second element, and annularly connecting the elements using a ring. The first element includes a first edge surface on which a burr is formed when the first element is formed by a press operation. The second element includes a second edge surface on which a burr is formed when the second element is formed by the press operation. The first and second edge surfaces face in directions opposite to each other in a direction in which the elements are arranged. The first edge surface includes a first rocking edge that contacts the element adjacent to the first element when the elements are arranged in an arc. The second edge surface includes a second rocking edge that contacts the element adjacent to the second element when the elements are arranged in the arc.

16 Claims, 7 Drawing Sheets

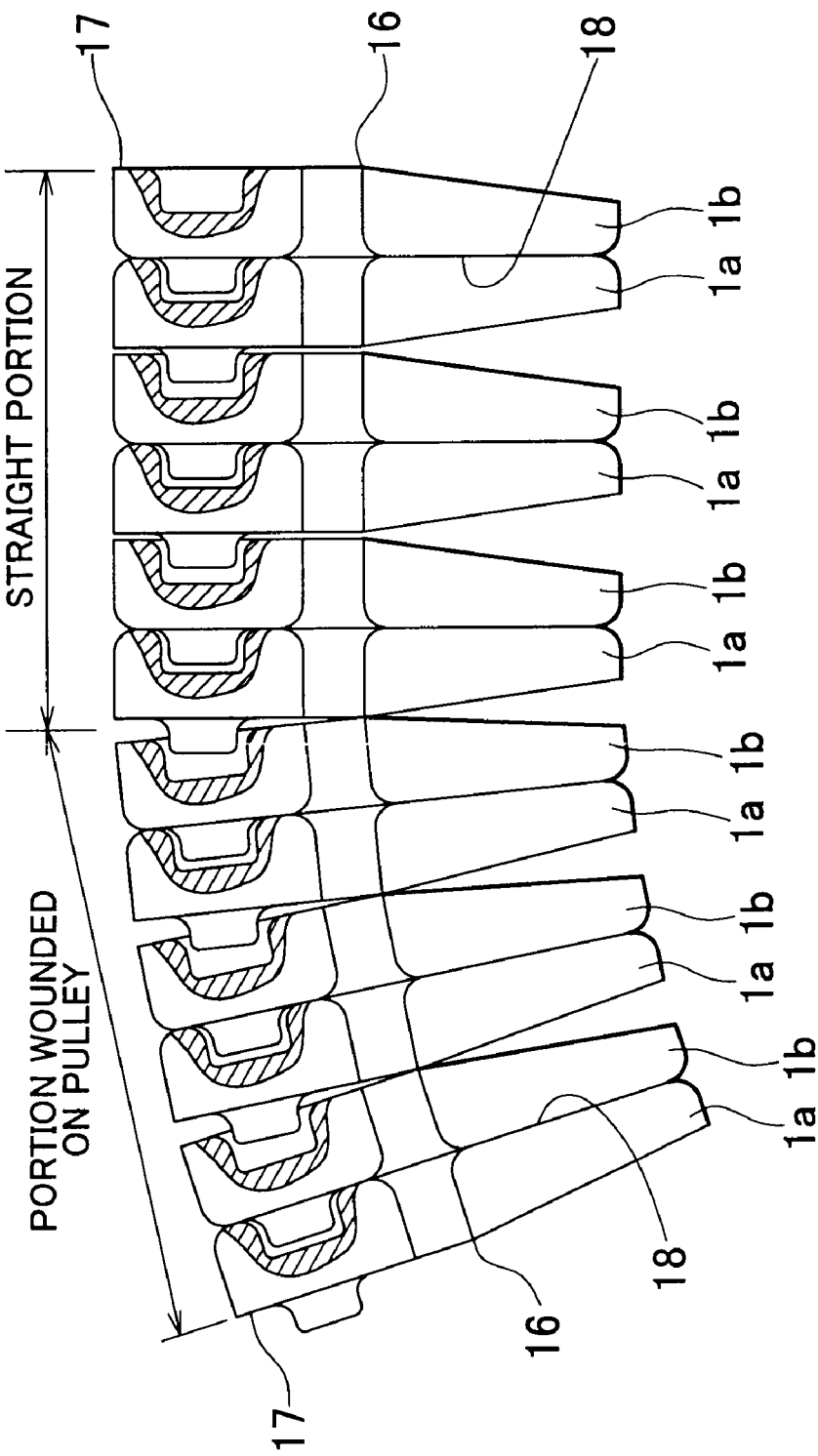

FIG. 7
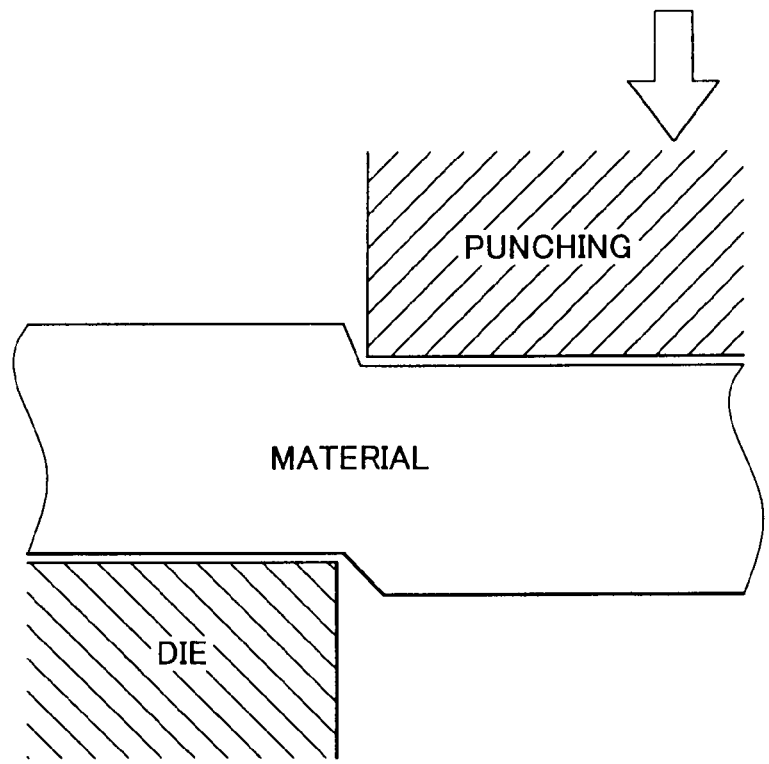
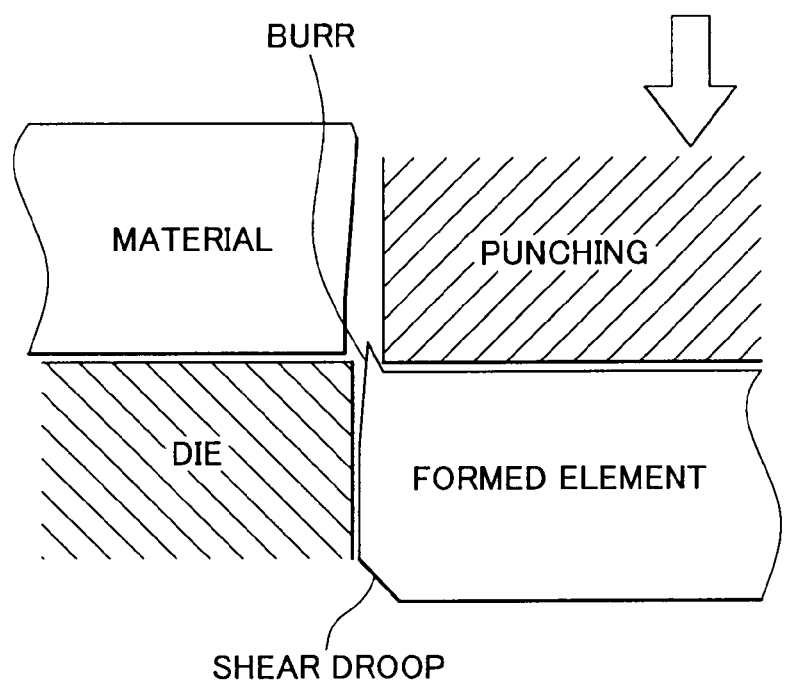

TRANSMISSION BELT

INCORPORATION BY REFERENCE

The disclosure of Japanese Patent Application No. 2007-150833 filed on Jun. 6, 2007 including the specification, drawings and abstract is incorporated herein by reference in its entirety.

BACKGROUND OF THE INVENTION

1. Field of the Invention

The invention relates to a transmission belt that includes an annular ring and a plurality of plate-shaped elements, and that is wound on two rotational members to transmit power between the two rotational members.

2. Description of the Related Art

A stepped transmission and a continuously variable transmission are generally used when power is transmitted between two rotational members. As the continuously variable transmission, a belt continuously variable transmission and a toroidal continuously variable transmission are available. In the belt continuously variable transmission, a transmission belt and two pulleys, that is, a drive pulley and a driven pulley are used to continuously change a gear ratio. As a transmission belt used in the belt continuously variable transmission, an endless annular belt is available. For example, the endless annular belt is formed by stacking a plurality of plates called elements or blocks in a thickness direction of the plate, annularly arranging the plates, and annularly connecting the plates using an annular metal band called a ring or a hoop.

When the transmission belt is wound on the two pulleys, that is, the drive pulley and the driven pulley, and the drive pulley is driven, a compression force in a direction in which the elements are stacked, that is, in a thickness direction of the element is applied to the elements from the drive pulley, according to a frictional force in an area where the elements and the drive pulley contact each other, and torque of the drive pulley. The compression force transmitted to the elements that are in contact with the drive pulley is transmitted to the elements that are in contact with the driven pulley, via the elements that are not wound on the pulleys, and are arranged in a straight line. When the compression force is transmitted to the elements that are in contact with the driven pulley, torque is generated to rotate the driven pulley, according to a frictional force in an area where the elements and the driven pulley contact each other, and the transmitted compression force. Thus, power is transmitted between the drive pulley and the driven pulley through the transmission belt.

Japanese Patent Application Publication No. 55-100443 (JP-A-55-100443) describes an example of the transmission belt and an example of the element used to form the transmission belt. The drive belt (transmission belt) described in the publication No. 55-100443 is wound on a V-shaped pulley, and has a substantially trapezoidal cross section. The transmission belt includes at least one metal circulation carrier (ring), and a plurality of lateral members (elements) slidably attached to the ring in a manner such that side surfaces of top portions in a plate-thickness direction contact each other. To make the transmission belt bendable, an inclined surface is formed in each element so that the plate thickness decreases toward an inside in a direction of a radius of the transmission belt (i.e., toward a position below a neutral line of the belt). Thus, the elements contact each other at inclination lines (rocking edges). The inclination line (rocking edge) is positioned at a border between the inclined surface and a portion of the side surface of the top portion, which is parallel to the opposite side surface of the top portion.

Japanese Patent Application Publication No. 4-83940 (JP-A-4-83940) describes a transmission belt that includes a stacking belt (ring), and a plurality of V-shaped blocks (elements). Each of the elements has a belt fitting groove in which the stacking belt is fitted. The elements are arranged in a direction in which the transmission belt rotates, and connected. A rocking edge is formed in each of the elements. When the transmission belt is bent, the elements adjacent to each other contact each other at the rocking edges that are positioned on a pitch circle. The elements include at least two types of elements that are different from each other in a distance from the rocking edge to a contact surface of the belt fitting groove, which contacts an innermost peripheral surface of the ring.

When the transmission belt described in each of the above-described publications is wound on the two pulleys, belt curve portions and belt straight portions are formed in the transmission belt. In each belt curve portion, the elements are wound on the pulley, and arranged in an arc. In each belt straight portion, the elements are not wound on the pulley, and arranged in a straight line. For example, in the publication No. 55-100443, the inclined surface is formed in each element so that the lower portion of the element is thin. Therefore, when the transmission belt is wound on the pulleys, the elements in each belt curve portion are arranged in a fan shape with respect to a center of the pulley. Thus, the elements in each belt curve portion are arranged in the arc in a manner such that the elements adjacent to each other closely contact each other.

In the transmission belt described in the above-described publication, the rocking edge is formed at a predetermined distance d from the contact surface of the element (i.e., a so-called saddle surface), which contacts the innermost peripheral surface of the ring, as shown in FIG. 5. As described above, the elements adjacent to each other contact each other at the rocking edges in each belt curve portion. Accordingly, a radius of the transmission belt wound on the pulley, that is, a distance from a center of the pulley on which the transmission belt is wound to the innermost peripheral surface of the ring differs from a distance from the center of the pulley to the rocking edge. Therefore, a frictional force between the element and the ring differs from a frictional force between the element and the pulley. As a result, a relative slip may occur between the element and the ring.

If a relative slip occurs between the element and the ring, power transmission efficiency of the transmission belt formed by the elements and the ring may be reduced. Accordingly, to avoid a relative slip between the element and the ring, it is conceivable to make a position of the saddle surface coincide with a position of the rocking edge in the height direction of the element (i.e., in the direction of the radius of the transmission belt wounded on the pulley at the belt curve portion), as shown in FIG. 6. However, in an ordinary method of forming the conventional element, it is difficult to make the position of the saddle surface completely coincide with the position of the rocking edge in the height direction of the element. Further, there is a plate-thickness difference or a level difference between a portion in which the saddle surface is formed and a portion in which the rocking edge is formed.

The above-described conventional elements are generally produced in large quantities, mainly by a press-punching operation, using a metal plate material, in view of productivity and economic efficiency. However, in this case, in a shear surface of the formed element, a burr is inevitably formed by a shearing operation, and a shear droop is inevitably formed when the material is pressed down by a cutting blade before the shearing operation is started, as shown in FIG. 7. Therefore, if the rocking edge is formed on a side surface on which the shear droop is formed when the element is formed by the punching operation, the sharp rocking edge is formed only in the neck portion of the element, which is not sheared when the punching operation is performed, and in which the shear droop is not formed when the punching operation is performed. As a result, there is a plate-thickness difference Δt between the neck portion of the element, in which the substantive rocking edge is formed, and the portion in which the saddle surface is formed, as shown in FIG. 6.

If there is the plate-thickness difference, the elements adjacent to each other contact each other only at the rocking edges formed in the neck portions of the elements. As a result, a large bending moment is applied to the neck portion of the element, or stress concentration occurs due to the bending moment in the neck portion of the element. This reduces the durability of the element, that is, the durability of the transmission belt. When the rocking edge is formed on a side surface on which the burr is formed when the element is formed by the punching operation, the sharp rocking edge is formed to extend over an entire width of the element. However, in this case, there is a level difference between a corner portion, which is positioned between the side surface opposite to the side surface on which the rocking edge is formed and the saddle surface, and the neck portion of the element. As a result, a bending moment is applied to the neck portion of the element, or stress concentration occurs due to the bending moment in the neck portion of the element, as in the case where the rocking edge is formed on the surface on which the shear droop is formed.

Thus, improvement needs to be made to increase the power transmission efficiency of the transmission belt, while preventing a reduction of the durability of the transmission belt, using the elements formed by an ordinary press operation.

SUMMARY OF THE INVENTION

The invention provides a transmission belt that has increased power transmission efficiency and sufficient durability, using elements that are easily formed by an ordinary press operation.

An aspect of the invention relates to a transmission belt. The transmission belt includes a plurality of elements annularly arranged, and an endless annular ring. The elements include: a first element in a plate shape, which includes a first edge surface on which a burr is formed when the first element is formed by a press operation; and a second element in a plate shape, which includes a second edge surface on which a burr is formed when the second element is formed by the press operation. The first edge surface and the second edge surface face in directions opposite to each other in a direction in which the elements are arranged. The endless annular ring annularly connects the elements that are annularly arranged in a manner such that the first edge surface and the second edge surface face in the directions opposite to each other. The first edge surface includes a first rocking edge that contacts the element adjacent to the first element when the elements are arranged in an arc. The second edge surface includes a second rocking edge that contacts the element adjacent to the second element when the elements are arranged in the arc.

The first element and the second element may include a first saddle surface and a second saddle surface, respectively. The first saddle surface and the second saddle surface may contact an inner peripheral surface of the ring. A position of the first rocking edge may coincide with a position of the first saddle surface in a height direction of the first element. A position of the second rocking edge may coincide with a position of the second saddle surface in a height direction of the second element. The height direction of the first element and the height direction of the second element may coincide with a direction of a radius of the arc when the elements are arranged in the arc.

A plurality of the first elements and a plurality of the second elements may be provided. The first elements and the second elements may be alternately arranged.

According to the above-described aspect, the rocking edge is formed on the side surface on which the burr is formed when the element (the first element, the second element) is formed by a press operation such as a punching operation, that is, the side surface on which the shear droop is not formed when the press operation is performed, and therefore, a sharp edge can be formed. Accordingly, the sharp rocking edge is formed in the element, without being affected by the shear droop that is formed when the press operation is formed. Therefore, it is possible to form the surface that contacts the inner peripheral surface of the ring, for example, when the elements are wound on the ring, and the rocking edge at the substantially same position in the height direction of the element. This reduces a relative slip between the inner peripheral surface of the ring and the element. Thus, it is possible to reduce frictional loss due to the relative slip, thereby increasing the transmission efficiency of the transmission belt.

Also, because the sharp rocking edge is formed in the element without being affected by the shear droop that is formed when the press operation is performed as described above, there is no variation in the plate thickness or level in a portion in which the rocking edge is formed. The transmission belt is formed by the two types of the elements that face in the directions opposite to each other in a direction in which the elements are arranged. That is, the transmission belt is formed by the two types of the elements, that is, the first element and the second element. In the first element, the sharp rocking edge is formed on a front surface that faces forward in a direction in which the transmission belt rotates when the transmission belt is wound on the pulleys to transmit power between the pulleys. In the second element, the sharp rocking edge is formed on a rear surface that faces rearward in the direction in which the transmission belt rotates. Therefore, by arranging the first element and the second element in a manner such that the front surface of the first element faces the rear surface of the second element, it is possible to make the first element and the second element contact each other at the sharp rocking edges. As a result, if a force in a tangential direction is transmitted to each of the end surfaces of the element, and a bending moment in a front-back direction is applied to the element when torque is transmitted by the transmission belt, the bending moment is not extremely large, and stress concentration does not occur, because the elements adjacent to each other contact each other at the rocking edges that extend in the entire width of the element, and there is no variation in the plate thickness or level in the portion in which the rocking edge is formed. This ensures sufficient durability of the element, that is, sufficient durability of the transmission belt.

Also, the saddle surface that contacts the inner peripheral surface of the ring when the ring is wound in the element, and the rocking edge are formed at the same or the substantially same position in the height direction of the element. In this case, a radius of the transmission belt wound on the pulley, that is, a distance from a center of the pulley on which the transmission belt is wound to the inner peripheral surface of the ring is substantially equal to a distance from the center of the pulley to the rocking edge. This reduces a difference between a frictional force between the element and the ring, and a frictional force between the element and the pulley. As a result, it is possible to reduce a relative slip between the inner peripheral surface of the ring and the element, which occurs due to the difference in the frictional force. Accordingly, it is possible to reduce frictional loss due to the relative slip, thereby increasing the transmission efficiency of the transmission belt.

When the first elements and the second elements are alternately arranged, the front surface of the first element faces the rear surface of the second element. In other words, the rear surface of the first element faces the front surface of the second element. That is, the first elements and the second elements are alternately arranged in the following manner. The first element and the second element, which are adjacent to each other, contact each other at the sharp rocking edges. Also, the first element and the second element, which are adjacent to each other, contact each other at the entire side surfaces that are uniformly flat, and that are opposite to the side surfaces on which the rocking edges are formed. Therefore, for example, if a force in a tangential direction is transmitted to each of the end surfaces of the element from the pulley, and a bending moment in a front-back direction is applied to the element when torque is transmitted by the transmission belt, the bending moment is not extremely large, and stress concentration does not occur, because the elements adjacent to each other contact each other at the rocking edges that extend in the entire width of the element, and there is no variation in the plate thickness or level in the portion in which the rocking edge is formed. This ensures sufficient durability of the element, that is, sufficient durability of the transmission belt.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 4 is a schematic diagram illustrating arrangement of first elements and second elements;

FIG. 7 is a schematic diagram illustrating a burr and a shear droop that are formed when the element is formed by a press operation (punching operation).

DETAILED DESCRIPTION OF EMBODIMENTS

Figure 1:
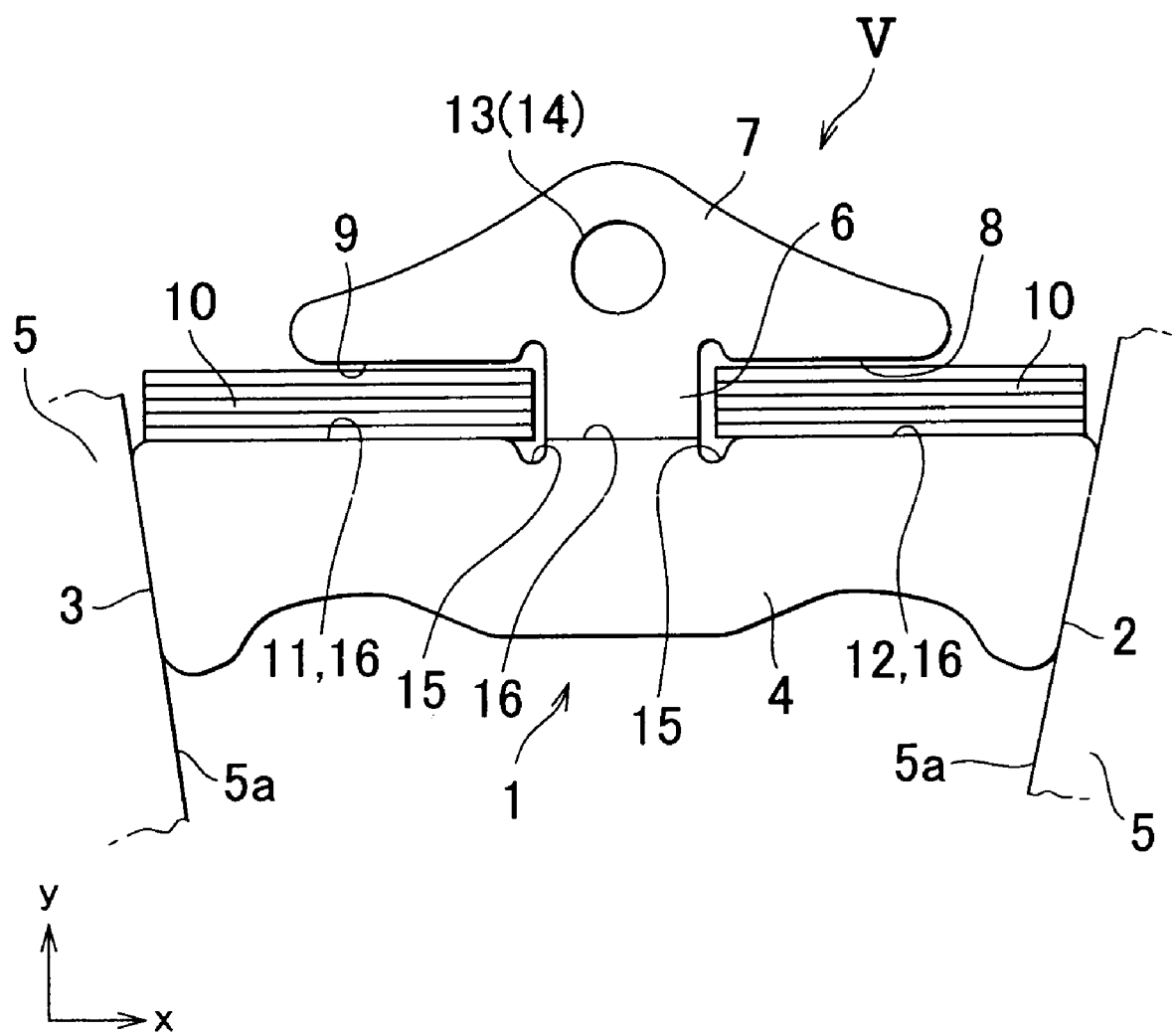
FIG. 1 is a front view schematically illustrating a configuration of a transmission belt according to an embodiment of the invention, particularly a configuration of an element of the transmission belt.
Figure 2:
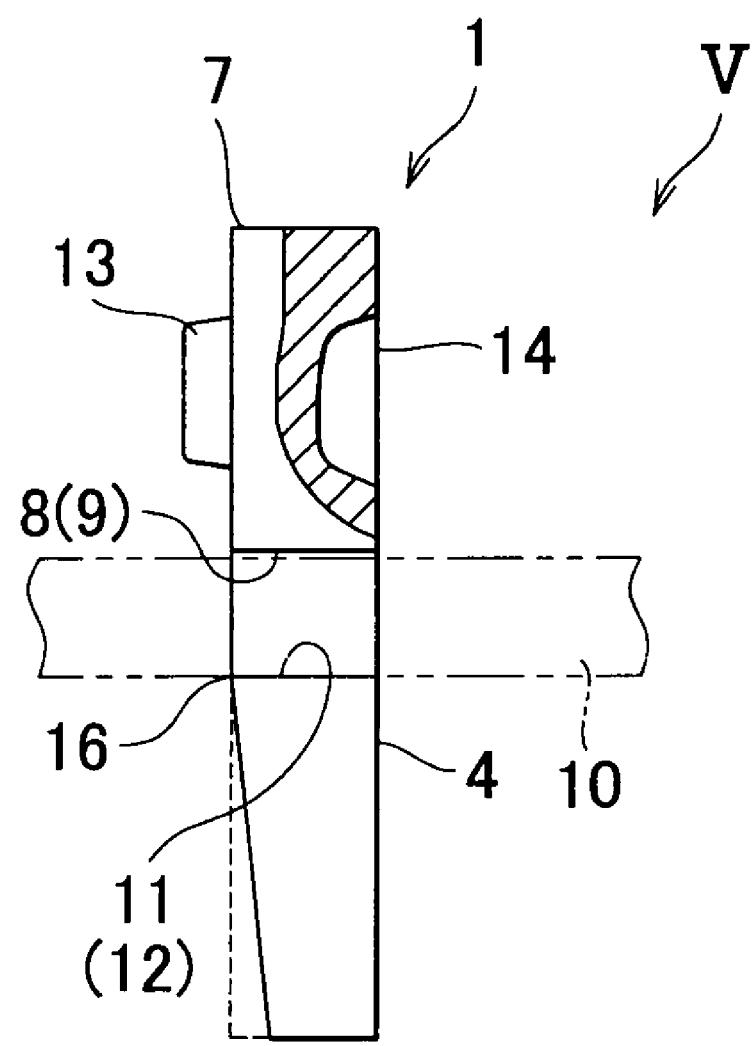
FIG. 2 is a partially sectional side view schematically illustrating the configuration of the transmission belt according to the embodiment of the invention, particularly the configuration of the element of the transmission belt.

An embodiment of the invention will be specifically described with reference to the drawings. Each of FIG. 1 to FIG. 3 shows an example of a configuration of an element used to form a transmission belt according to the embodiment of the invention. The transmission belt V is an example of a belt that is wound on, for example, a drive pulley (input shaft pulley) and a driven pulley (output shaft pulley) of a belt continuously variable transmission, to transmit power between the pulleys. In FIG. 1, for example, an element 1 is a metal plate member. The element 1 includes a plate portion (body portion) 4 that serves as a base body. Right and left end surfaces 2 and 3 of the plate portion 4 in a width direction of the plate portion 4 (i.e., in a x-direction in FIG. 1) are tapered surfaces. The right and left tapered end surfaces 2 and 3 are in friction contact with a belt groove (V-groove) 5a of a pulley 5 that is the drive pulley or the driven pulley of the belt continuously variable transmission so that torque is transmitted. Thus, the right and left tapered end surfaces 2 and 3 serve as friction surfaces.

A neck portion 6 is formed to extend upward (in FIG. 1) from a center portion of the plate portion 4 in the width direction of the plate portion 4 (i.e., in the x-direction in FIG. 1). A top portion 7 in an umbrella shape is formed integrally with the neck portion 6. The top portion 7 is provided on an upper end of the neck portion 6. The top portion 7 extends toward both sides in the width direction of the plate portion 4. Thus, slit portions (groove portions) 8 and 9, which are opening portions extending in a lateral direction (in FIG. 1), are formed between upper edge portions of the plate portion 4 (in FIG. 1 and FIG. 2), and lower edge portions of the top portion 7 (in FIG. 1 and FIG. 2). The slit portions 8 and 9 are used to annularly connect the elements 1 that are annularly arranged, and closely contact each other. For example, a ring 10, which is an annular metal belt, is inserted and wound in the slit portions (groove portions) 8 and 9. Saddle surfaces 11 and 12 are the upper edge portions of the plate portion 4 (in FIG. 1 and FIG. 2). An inner peripheral surface of the ring 10 is placed on the saddle surfaces 11 and 12 in a manner such that the inner peripheral surface of the ring 10 contacts the saddle surfaces 11 and 12. In other words, the saddle surfaces 11 and 12 contact the inner peripheral surface of the ring 10 when the ring 10 is wound in the slit portions 8 and 9 of the element 1.

A protruding portion 13 and a recessed portion 14 are formed in each element 1. The protruding portions 13 and the recessed portions 14 of the elements 1 are used to position the elements 1 relative to each other. That is, the protruding portion 13, which has a circular cross section, is formed on one side surface of the element 1 (i.e., the side surface on which a rocking edge 16 (described later) is formed in an example shown in FIG. 2) at a position in a direction in which the neck portion 6 extends (i.e., at a center of the top portion 7). The recessed portion 14, which has a bottomed-cylindrical shape, is formed on the side surface opposite to the side surface on which the protruding portion 13 is formed. The protruding portion 13 in the adjacent element 1 is loosely fitted (inserted) in the recessed portion 14. Thus, by fitting the protruding portions 13 in the recessed portions 14, the elements 1 are positioned relative to each other in the lateral direction and a vertical direction (in FIG. 1).

The position of the element 1 with the above-described configuration in the vertical direction (in FIG. 1 and FIG. 2) is regulated by the protruding portion 13 and the recessed portion 14. A downward load (in FIG. 1 and FIG. 2) is applied to the saddle surfaces 11 and 12 by a tensional force of the ring 10. Therefore, if there is variation in a length between the protruding portion 13 or the recessed portion 14 and the saddle surfaces 11 and 12, the load is applied to pull or compress the neck portion 6. In this case, because saddle surfaces 11 and 12 extend from a proximate end portion of the neck portion 6 in a direction perpendicular to the neck portion 6 (i.e., the x-direction in FIG. 1), a bending moment is applied to areas between the neck portion 6 and the saddle surfaces 11 and 12. The bending moment is largest at corner portions that are border portions between the neck portion 6 and the saddle surfaces 11 and 12. Thus, rounded portions 15, which are recessed in an arc, are formed at the border portions (corner portions), to prevent concentration of stress at the border portions (corner portions), as shown in FIG. 1.

The elements 1, which are annularly arranged, are connected using the ring 10. Then, the elements 1 in this state are wound on the drive pulley 5 and the driven pulley 5. Accordingly, when the elements 1 are wound on the pulleys 5, the elements 1 need to be arranged in a fan shape with respect to a center of each pulley 5, that is, the elements 1 need to be arranged in an arc, and the elements 1 need to closely contact each other. Therefore, a lower portion of each element 1 (in FIG. 1 and FIG. 2) is thin (i.e., the portion of each element 1, which is positioned close to a center of the annularly-arranged elements 1, is thin).

That is, in one side surface of the plate portion 4 (for example, the left side surface in FIG. 2), a lower portion positioned below the saddle surfaces 11 and 12 is shaved so that the thickness of the element 1 gradually decreases. More specifically, in one side surface of the plate portion 4 in a thickness direction of the plate portion 4 (i.e., in a z-direction in FIG. 2), the lower portion, which is positioned below the saddle surfaces 11 and 12 in a height direction of the element 1 (i.e., in a y-direction in FIG. 1 and FIG. 2), that is, in a direction of a radius of the arc when the elements 1 are arranged in the arc, is formed so that the thickness of the element 1 gradually decreases toward a lower end of the element 1.

Thus, when the elements 1 are arranged in the fan shape, each element 1 contacts the adjacent element 1 at border portions at which the thickness starts to change, that is, corner portions between the one side surface of the plate portion 4 and the saddle surfaces 11 and 12. That is, an edge extending in the border portions is the rocking edge 16 that contacts the adjacent element 1 when the elements 1 are arranged in the arc. Thus, in the element 1 according to the invention, the position of the rocking edge 16 in the height direction of the element 1 coincides with the position of the saddle surfaces 11 and 12 in the height direction of the element 1. The phrase "the position of the rocking edge 16 in the height direction of the element 1 coincides with the position of the saddle surfaces 11 and 12 in the height direction of the element 1" signifies that a difference between the position of the rocking edge 16 and the position of the saddle surfaces 11 and 12 in the height direction of the element 1 is smaller than a length of a shear droop (18*a*) in the height direction of the element 1. The shear droop is formed when the element 1 is formed by a punching operation.

The element 1 is made of a metal plate material as described above, and the element 1 is formed by a press-punching operation. Therefore, a burr is inevitably formed on one side surface of the element 1 in the plate-thickness direction of the element 1 when the material is sheared, and a shear droop is inevitably formed on the other side surface of the element 1 in the plate-thickness direction of the element 1. If the above-described rocking edge 16 is formed on the side surface on which the shear droop is formed, the shear droop is formed in the corner portions between the side surface and the saddle surfaces 11 and 12. Accordingly, the substantive rocking edge 16, that is, the sharp rocking edge 16 is formed to extend in the width direction of the element 1, only in the neck portion 6 that is not sheared when the punching operation is performed.

Thus, in the element used to form the transmission belt V according to the embodiment, the above-described rocking edge 16 is formed on the side surface on which the burr is formed when the punching operation is performed.

Figure 3A:
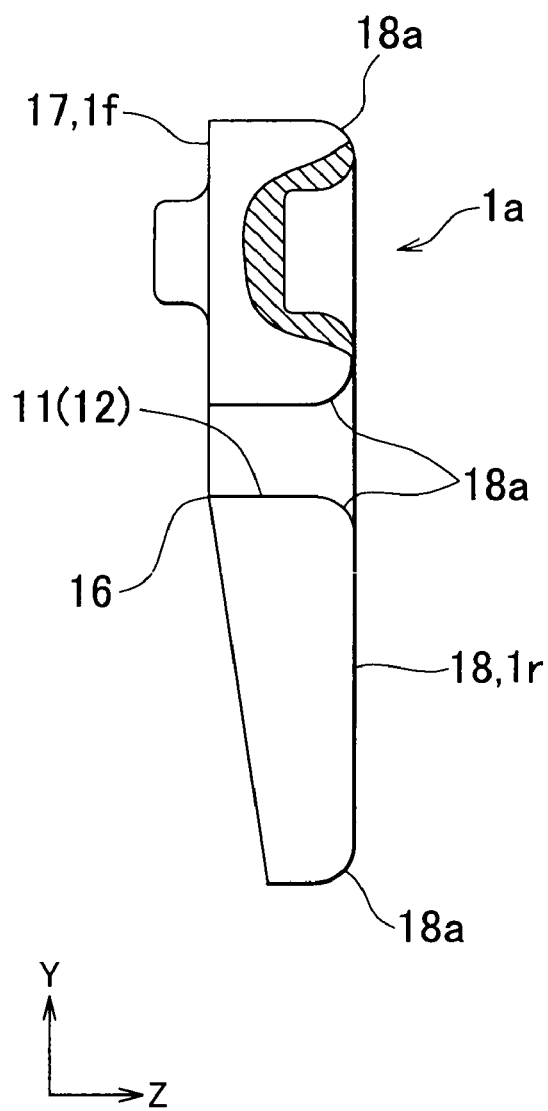
FIGS. 3A and 3B are partially sectional side views schematically illustrating the configuration of the transmission belt according to the embodiment of the invention, particularly the configuration of the elements of the transmission belt.

That is, in FIG. 3A, the left side surface (in FIG. 3A) is an edge surface 17 on which the burr is formed when the punching operation is performed, and the right side surface (in FIG. 3A) is a shear droop surface 18 on which the shear droop 18*a* is formed when the punching operation is performed. On the edge surface 17, the rocking edge 16 is formed to extend in the corner portions between the edge surface 17 and the saddle surfaces 11 and 12.

Further, in the element 1 shown in FIG. 3A, the left side surface (in FIG. 3A), that is, the edge surface 17 is a front surface 1*f* in a direction in which the transmission belt V rotates when the transmission belt V is formed by annularly arranging and connecting the elements 1. The right side surface (in FIG. 3A), that is, the shear droop surface 18 is a rear surface 1*r* in the direction in which the transmission belt V rotates. Thus, the element 1 shown in FIG. 3A is an element 1*a* whose one side surface (the left side surface in FIG. 3A) serves as the edge surface 17, and also serves as the front surface 1*f* in the direction in which the transmission belt V rotates. The element 1*a* may be regarded as the first element.

Figure 3B:
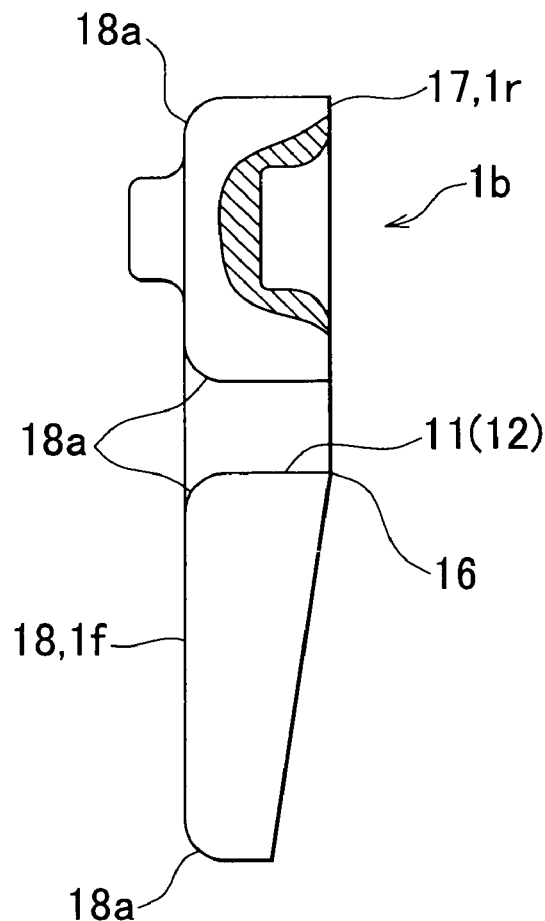
Figure 5:
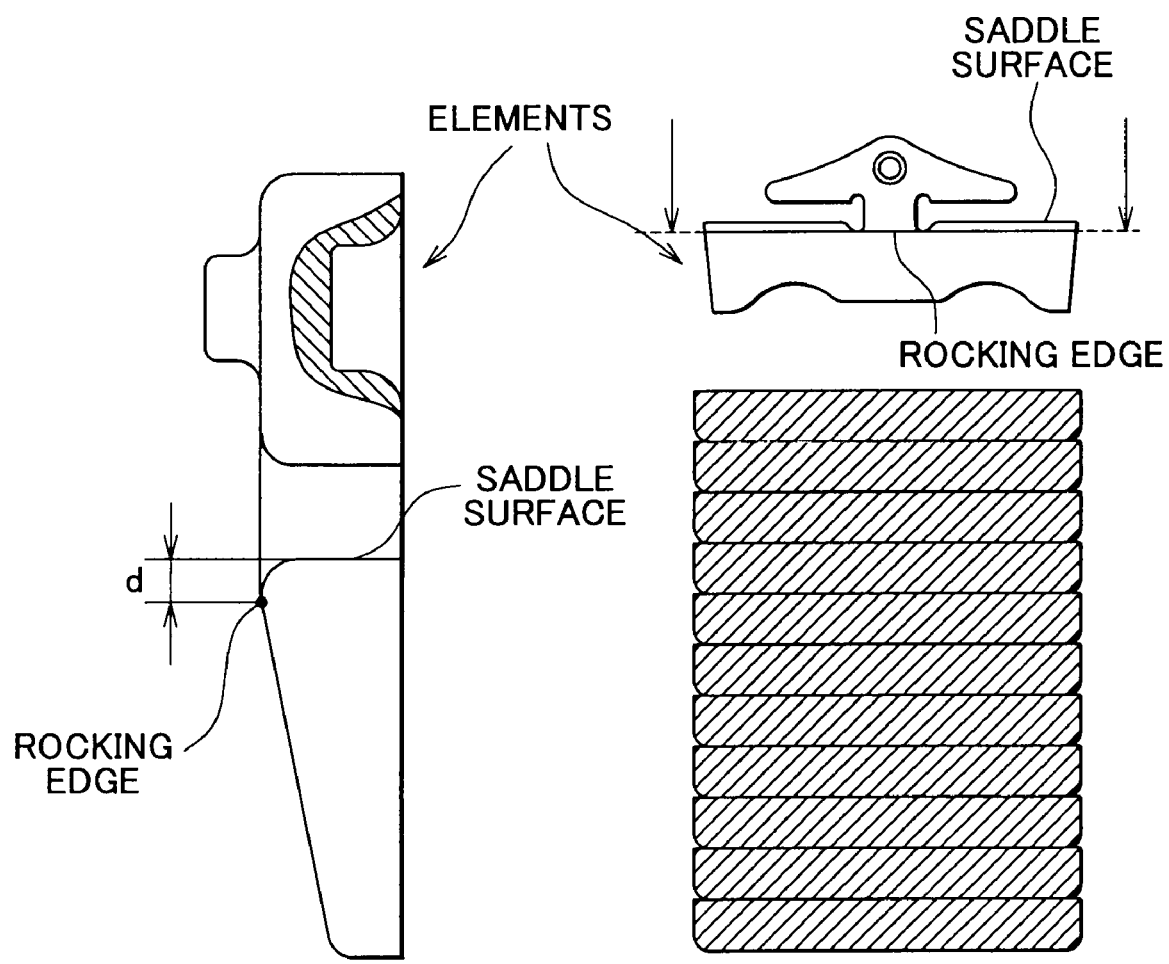
FIG. 5 is a schematic diagram illustrating a configuration of a conventional element, and arrangement of the conventional elements.
Figure 6:
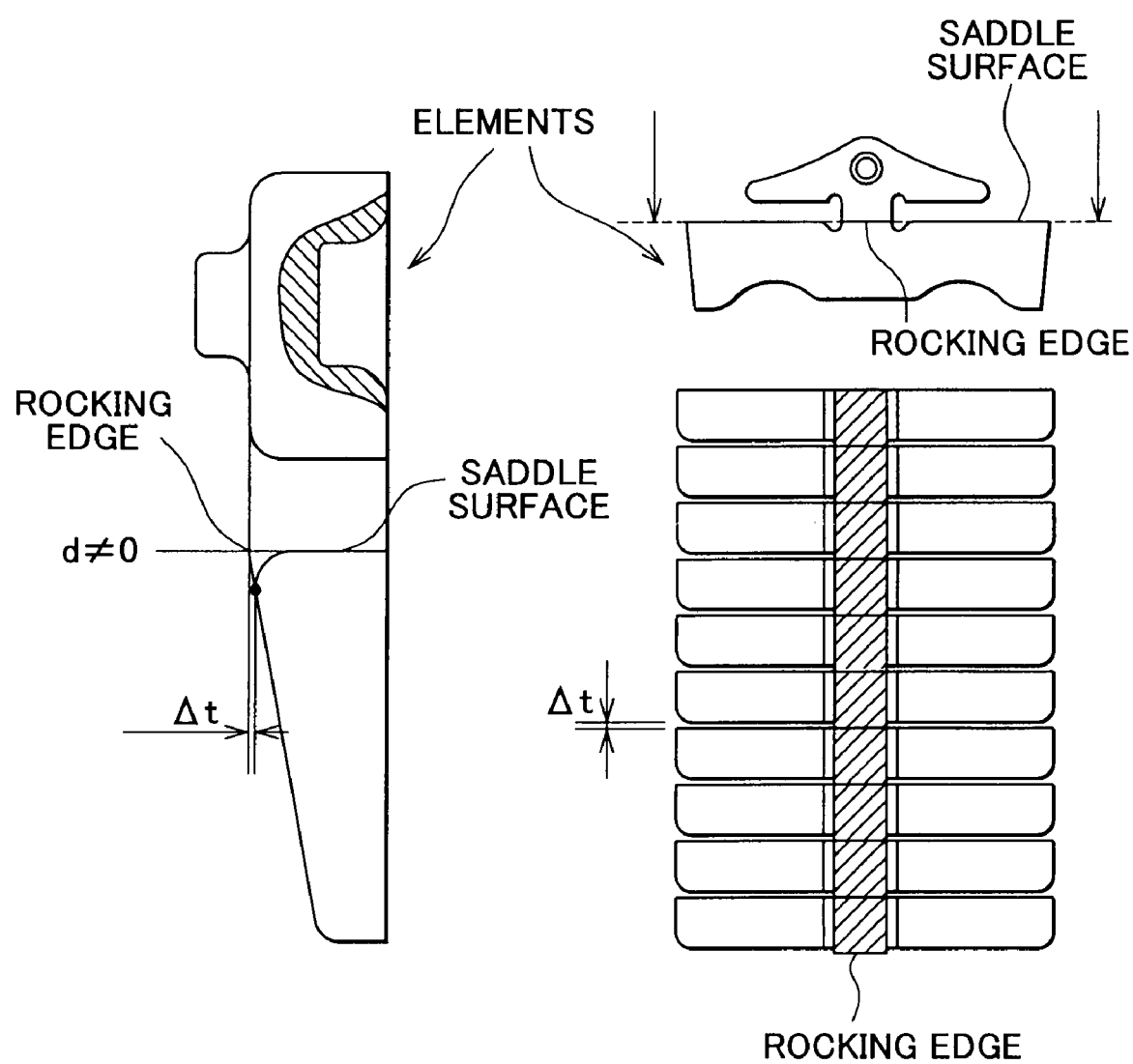
FIG. 6 is a schematic diagram illustrating the configuration of the conventional element, and arrangement of the conventional elements, when a distance between a saddle surface and a rocking edge is made substantially zero in the conventional element.

In FIG. 3B, the right side surface (in FIG. 3B) is the edge surface 17 on which the burr is formed when the punching operation is performed. The left side surface (in FIG. 3B) is the shear droop surface 18 on which the shear droop 18*a* is formed when the punching operation is performed. On the edge surface 17, the rocking edge 16 is formed to extend in the corner portions between the edge surface 17 and the saddle surfaces 11 and 12.

In the element 1 shown in FIG. 3B, the right side surface (in FIG. 3B), that is, the edge surface 17 is the rear surface 1*r* in a direction in which the transmission belt V rotates when the transmission belt V is formed by annularly arranging and connecting the elements 1. The left side surface (in FIG. 3B), that is, the shear droop surface 18 is the front surface 1*f* in the direction in which the transmission belt V rotates. Thus, the element 1 shown in FIG. 3B is an element 1*b* whose one side surface (the right side surface in FIG. 3B) serves as the edge surface 17 and also serves as the rear surface 1*r* in the direction in which the transmission belt V rotates. The element 1*b* may be regarded as the second element.

Thus, by forming the rocking edge 16 on the edge surface 17, that is, the side surface on which the shear droop is not formed when the punching operation is performed, the sharp rocking edge 16 is formed to extend over an entire width of the element 1, without being affected by the shear droop.

Accordingly, the elements 1 in the embodiment include two types of elements, i.e., the first element 1*a* and the second element 1*b*. As shown in FIG. 4, the transmission belt V according to the invention is formed by alternately arranging the first elements 1*a* and the second elements 1*b* in a manner such that the front surface 1*f* of the element 1 faces the rear surface 1*r* of the adjacent element 1, and annularly connecting the first elements 1*a* and the second elements 1*b* using the ring 10. That is, the first elements 1*a* and the second elements 1*b* are alternately arranged in the following manner. The first element 1*a* and the second element 1*b*, which are adjacent to each other, contact each other at the sharp rocking edges 16 formed on the edge surfaces 17. Also, the first element 1*a* and the second element 1b, which are adjacent to each other, contact each other at the entire shear droop surfaces 18 that are opposite to the edge surfaces 17, and that are uniformly flat.

In the transmission belt V according to the embodiment formed using the element 1 thus formed and the ring 10, the rocking edge 16 is formed on the side surface on which the burr is formed when the element 1 is formed by a press operation, such as a punching operation. That is, the rocking edge 16 is formed on the edge surface 17 on which the shear droop is not formed when the press operation is performed, and therefore, the sharp edge can be formed. Accordingly, the sharp rocking edge 16 is formed in the element 1, without being affected by the "shear droop" formed in the press operation.

Also, because the sharp rocking edge 16 is formed, the saddle surfaces 11 and 12 and the rocking edge 16 are formed at the same position or the substantially same position in the height direction of the element 1. Therefore, a radius of the transmission belt V wound on the pulley 5, that is, a distance from a center of the pulley 5 on which the transmission belt V is wound to the inner peripheral surface of the ring 10 is substantially equal to a distance from the center of the pulley 5 on which the transmission belt V is wound to the rocking edge 16. This reduces a difference between a frictional force between the element 1 and the ring 10, and a frictional force between the element 1 and the pulley 5. As a result, it is possible to reduce a relative slip between the inner peripheral surface of the ring 10 and the element 1, which occurs due to the difference in the frictional force. Accordingly, it is possible to reduce frictional loss due to the relative slip, thereby increasing the transmission efficiency of the transmission belt V.

The first elements 1a and the second elements 1b are alternately arranged in the following manner. The first element 1a and the second element 1b, which are adjacent to each other, contact each other at the sharp rocking edges 16. The sharp rocking edge 16 is formed on the edge surface 17 to extend over the entire width of the element 1, and there is no variation in the plate thickness or level in the portion in which the rocking edge is formed. Also, the first element 1a and the second element 1b, which are adjacent to each other, contact each other at the entire shear droop surfaces 18 that are uniformly flat. Therefore, for example, if a force in a tangential direction is transmitted to each of the end surfaces 2 and 3 of the element 1 from the pulley 5, and a bending moment in a front-back direction is applied to the element 1 when torque is transmitted by the transmission belt V, the bending moment is not extremely large, and stress concentration does not occur. This ensures sufficient durability of the element 1, that is, sufficient durability of the transmission belt V.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention. For example, in the above-described embodiment, the transmission belt is used in the belt continuously variable transmission. However, the transmission belt need not necessarily be used in the belt continuously variable transmission. The transmission belt may be used in a transmission device that includes a pulley and a belt wound on the pulley.

What is claimed is:

1. A transmission belt comprising:
   a plurality of elements annularly arranged, including:
      a first element in a plate shape, which includes a first edge surface on which a burr is formed when the first element is formed by a press operation; and
      a second element in a plate shape, which includes a second edge surface on which a burr is formed when the second element is formed by the press operation, wherein the first edge surface and the second edge surface face in directions opposite to each other in a direction in which the elements are arranged;
   an endless annular ring that annularly connects the elements that are annularly arranged in a manner such that the first edge surface and the second edge surface face in the directions opposite to each other,
   wherein:
   the first edge surface includes a first rocking edge that contacts the element adjacent to the first element when the elements are arranged in an arc; and
   the second edge surface includes a second rocking edge that contacts the element adjacent to the second element when the elements are arranged in the arc.

2. The transmission belt according to claim 1, wherein:
   the first element and the second element include a first saddle surface and a second saddle surface, respectively;
   the first saddle surface and the second saddle surface contact an inner peripheral surface of the ring;
   a position of the first rocking edge coincides with a position of the first saddle surface in a height direction of the first element;
   a position of the second rocking edge coincides with a position of the second saddle surface in a height direction of the second element; and
   the height direction of the first element and the height direction of the second element coincide with a direction of a radius of the arc when the elements are arranged in the arc.

3. The transmission belt according to claim 2, wherein:
   the first element includes:
      a first body portion;
      a first neck portion that extends upward from a substantially center of an upper surface of the first body portion in a width direction of the first body portion, in a view perpendicular to a direction in which the elements are arranged;
      a top portion in an umbrella shape, which is provided on an upper end of the first neck portion, and which extends in the width direction of the first body portion; and
   the second element includes:
      a second body portion;
      a second neck portion that extends upward from a substantially center of an upper surface of the second body portion in a width direction of the second body portion, in a view perpendicular to a direction in which the elements are arranged;
      a top portion in an umbrella shape, which is provided on an upper end of the second neck portion, and which extends in the width direction of the second body portion.

4. The transmission belt according to claim 3, wherein:
   the first saddle surface includes two first saddle surfaces that are provided on the upper surface of the first body portion at positions on both sides of the first neck portion in the width direction of the first body portion; and the second saddle surface includes two second saddle surfaces that are provided on the upper surface of the second body portion at positions on both sides of the second neck portion in the width direction of the second body portion.

5. The transmission belt according to claim 4, wherein:
the ring includes a first ring and a second ring;
the first ring is wound on one of the two first saddle surfaces and one of the two second saddle surfaces; and
the second ring is wound on the other of the two first saddle surfaces and the other of the two second saddle surfaces.

6. The transmission belt according to claim 3, wherein:
a rounded portion, which is recessed in an arc, is formed in a border portion between the first saddle surface and the first neck portion; and
a rounded portion, which is recessed in an arc, is formed in a border portion between the second saddle surface and the second neck portion.

7. The transmission belt according to claim 1, wherein:
a plurality of the first elements and a plurality of the second elements are provided; and
the first elements and the second elements are alternately arranged.

8. The transmission belt according to claim 7, wherein:
each of the first elements includes a first shear droop surface opposite to the first edge surface;
each of the second elements includes a second shear droop surface opposite to the second edge surface; and
the substantially entire first shear droop surface and the substantially entire second shear droop surface contact each other.

9. The transmission belt according to claim 1, wherein the first edge surface and the second edge surface face each other.

10. The transmission belt according to claim 9, wherein:
each of the first elements includes a first protruding portion that protrudes from the first edge surface, and a first recessed portion formed on a surface opposite to the first edge surface;
each of the second elements includes a second recessed portion formed on the second edge surface, and a second protruding portion that protrudes from a surface opposite to the second edge surface; and
the first protruding portion engages with the second recessed portion.

11. The transmission belt according to claim 9, wherein when the elements including the first element and the second element are arranged in the arc, the first rocking edge contacts the second rocking edge.

12. The transmission belt according to claim 1, wherein:
the first edge surface includes an inclined surface that is inclined so that a thickness of the first element decreases from the first rocking edge toward a lower end of the first element; and
the second edge surface includes an inclined surface that is inclined so that a thickness of the second element decreases from the second rocking edge toward a lower end of the second element.

13. The transmission belt according to claim 1, wherein:
the first rocking edge is formed at a position at which the burr is formed on the first edge surface; and
the second rocking edge is formed at a position at which the burr is formed on the second edge surface.

14. The transmission belt according to claim 13, wherein:
the first rocking edge is formed to extend over a substantially entire width of the first edge surface; and
the second rocking edge is formed to extend over a substantially entire width of the second edge surface.

15. A belt continuously variable transmission comprising:
a drive pulley;
a driven pulley; and
the transmission belt according to claim 1, which is wound on the drive pulley and the driven pulley, and which transmits power between the drive pulley and the driven pulley.

16. The belt continuously variable transmission according to claim 15, wherein:
the first edge surface faces forward in a direction in which the transmission belt rotates when the transmission belt transmits the power between the drive pulley and the driven pulley; and
the second edge surface faces rearward in the direction in which the transmission belt rotates when the transmission belt transmits the power between the drive pulley and the driven pulley.

* * * * *